United States Patent [19]

Luckanuck

[11] Patent Number: 5,085,897

[45] Date of Patent: *Feb. 4, 1992

[54] FIRE RETARDANT INSULATION SPRAY COATING METHOD

[75] Inventor: John S. Luckanuck, Burlington, Canada

[73] Assignee: Radixx/World, Ltd., Burlington, Canada

[*] Notice: The portion of the term of this patent subsequent to Oct. 2, 2007 has been disclaimed.

[21] Appl. No.: 502,932

[22] Filed: Apr. 2, 1990

[51] Int. Cl.$^5$ .................. B05D 3/02; B05D 1/02; B32B 9/06
[52] U.S. Cl. .................. 427/421; 427/397.8; 106/600; 106/605; 428/446; 428/450
[58] Field of Search .................. 427/397.8, 421; 106/600, 605; 428/446, 450

[56] References Cited

U.S. PATENT DOCUMENTS

| | | | |
|---|---|---|---|
| 3,804,701 | 4/1974 | Bognar | 106/38.22 |
| 4,088,810 | 5/1978 | Lodge | 427/397.8 |
| 4,095,985 | 6/1978 | Brown | 106/18.12 |
| 4,263,048 | 4/1981 | Hacker | 106/601 |
| 4,288,253 | 9/1981 | Venable | 106/605 |
| 4,842,772 | 6/1989 | Withiam | 427/397.8 |
| 4,960,621 | 10/1990 | Luckanuck | 427/397.8 |

*Primary Examiner*—Michael Lusignan
*Assistant Examiner*—Diana L. Dudash
*Attorney, Agent, or Firm*—Tilton, Fallon, Lungmus & Chestnut

[57] ABSTRACT

The use of a liquid mixture of a liquid alkali-metal silicate preferably sodium or potassium silicate and more preferably sodium silicate with an inert mineral filler selected from perlite and vermiculite, suitably in an amount from 5 to 50% by weight and a mineral powder suitably selected from aluminum trihydrate and Wollastonite in an amount such as to intumesce with said silicate and to form a non-porous ceramic coating when subject to fire and suitably in an amount from 2 to 25% by weight for the protection of steel beams and columns against twisting due to fire. The formation of such coating both insulates and protects the steel beam or column from the heat from said fire. Suitably the thickness of the coating is at least two inches and is preferably from 2 to 4 inches to achieve the protection.

14 Claims, No Drawings

FIRE RETARDANT INSULATION SPRAY COATING METHOD

BACKGROUND AND SUMMARY OF INVENTION

The present invention relates to the protection of surfaces and in particular steel beams and columns in commercial buildings from twisting due to fire and in particular related to a fire retardant composition which may be sprayed onto the surfaces of the steel beams and columns from conventional spray equipment.

Heretofore, for their protection from twisting in a fire in commercial buildings steel columns and beams have inter alia been coated with a wet mixture of cement and rockwool and such a coating, which is normally sprayed onto the columns from specially designed spray equipment, has been found to be very effective in stopping the steel columns and beams from twisting and being subjected to fire compositions and readily passes the steel column fire endurance test.

However, the appearance of the coating is poor and it is necessary when a good appearance is required, i.e., where the beam or column is visible in occupied parts of the building to further treat the surface of the steel column to improve its appearance. Further, the use of an aqueous mixture of cement and rockwool involves the use of a substantial amount of water which makes the process of coating the columns very messy and due to the presence of large amounts of water there is dripping of the coated columns. This limits the areas of the buildings in which the beams and columns can be coated. In particular, it is not desirable to coat steel columns and beams with this mixture in areas where the interior decoration of the building has been effected.

It is also known to coat the steel columns and beams with a mixture of alkali-metal silicate, rockwool and paper fibers. However, it is found that the rockwool, due to its low melting point, tends to melt when subjected to fire and the composition does not pass the steel column fire endurance test.

It is an object of the present invention to provide a composition which may be sprayed onto steel columns and beams in buildings irrespective of their location, involving the use of minimum amounts of water, thus not causing any significant mess problems in application of the coating and at the same time to provide a good appearance in the finished steel column or beam and further to provide efficient protection to avoid twisting of the steel column or beam under fire conditions and thus be able to pass the steel column fire endurance test.

DETAILED DESCRIPTION

According to the present invention, therefore, there is provided a method of protecting steel beams and columns from twisting in a building construction when subjected to fire, which comprises coating said beams and columns with a mixture of a liquid alkali-metal silicate, an inert mineral filler selected from perlite, and vermiculite and a mineral powder in an amount such as to intumesce with said silicate and form a non-porous ceramic coating when subjected to fire.

The liquid alkali-metal silicate is preferably sodium or potassium silicate, such as supplied under the trademarks KASIL, Kasil 88, Kasil 6, by PD Corporation or SS, SS65, SSG, GD by National Silicates Ltd. The liquid alkali-metal silicate is preferably sodium silicate for economic reasons and is suitably waterglass. It will be noted that the only liquid present in the mixture is this liquid alkali-metal silicate which contains a minimum amount of water and thus the spraying of the coating composition does not present any mess or excess water when it is sprayed onto the steel columns or beams.

The mineral powder is one which when present in a sufficient amount will intumesce with said silicate to form a non-porous ceramic coating when subjected to fire and is suitably aluminum trihydrate, such as that supplied under the trademark Hydrated Alumina Polyfil 130 or Wollastonite such as that supplied under the trademark Nyad or Nycor by the Nyco Division of Process Minerals Inc. In order to achieve such a non-porous ceramic coating when subjected to fire, the mineral powder is suitably present in an amount 2 to 25% by weight, and more preferably 10 to 20% by weight in the composition. The inert mineral filler is suitably selected from perlite or vermiculite which materials besides providing thermal insulation and sound control where required also provide for fire retardancy. Further perlite has a melting point of around 1800° C., vermiculite around 1500° C. and thus, they do not melt in the composition when it is subjected to fire, thus maintaining the thermal insulation of the composition when subjected to fire.

Again the use of particulate vermiculite and perlite provides a very attractive appearance to the surface of the coated steel beam or column.

In order to achieve the protection of the steel columns and beams the coating must of course be of sufficient thickness and suitably the thickness of the column should be at least 2 inches and more preferably of the order to 4 inches or more. The maximum thickness is purely one of economics and desirability. A typical composition which achieves the good appearance and good protection of the steel column or beam and provides the thermal insulation and sound control where required is one which comprises 50% by weight sodium silicate, 40% by weight perlite and 20% by weight Nyad 400. Such a composition coated onto a steel beam or column, by conventional spray methods using conventional equipment at a thickness of 2 to 4 inches provides the required protection to prevent twisting of the steel columns and beams under fire conditions and passes the steel column fire endurance test.

It is, of course, manifestly clear that while the composition of the present invention are primarily intended to be used for coating steel columns and beams to protect them from twisting under fire conditions in commercial buildings due to the ease of application and the non-messy application it is also possible to coat the surfaces in buildings which have already been subjected to decoration and in particular can be used for spraying ceilings to form a stippled fire retardant coating thereon. Thus, the present invention also provides a method of forming a fire retardant stipple coating on a ceiling which comprises of blowing thereon the aforesaid composition.

Suitably the amount of mineral filler, such as the Nyad is in the range of 2 to 50%. The protection of the beams and columns from fire increases with amount of mineral powder present. However, as the amount of mineral filler approaches above 50% by weight it is found that there is substantial dusting which occurs in the application of the coating to the steel beams and columns which is undesirable.

I claim:

1. A method for protecting steel columns and beams in a commercial building construction from twisting when subjected to fire, which comprises coating said columns and beams with a mixture consisting essentially of a liquid alkali-metal silicate, 5 to 50% by weight of an inert mineral filler selected from perlite and vermiculite, 2 to 25% by weight of a mineral powder which will intumesce with said silicate and form a non-porous ceramic coating when subjected to fire, said mineral powder being a member selected from the class consisting of aluminum trihydrate and Wollastonite.

2. A method as claimed in claim 1, in which the mineral powder is present in the mixture in an amount from 10 to 20% by weight.

3. A method as claimed in claim 1, in which the inert mineral filler is present in the mixture in the amount of from 20 to 40% by weight.

4. A method as claimed in claim 1 in which the inert mineral filler is perlite.

5. A method as claimed in claim 1 in which the alkali-metal silicate is sodium or potassium silicate.

6. A method as claimed in claim 1 in which the alkali-metal silicate is sodium silicate.

7. A method as claimed in claim 1 in which the coating is at least 2 inches in thickness.

8. A method as claimed in claim 1 in which the coating is at least about 4 inches in thickness.

9. A method for protecting a ceiling in a building form the effects of fire which comprises coating by spraying thereon a mixture consisting essentially of a liquid alkali-metal silicate, 5 to 50% by weight of an inert mineral filler selected from perlite and vermiculite and 2 to 25% by weight of a mineral powder which will intumesce with said silicate and form a non-porous ceramic coating when subjected to fire, said coating being in the form of a stippled coating, said mineral powder being a member selected from the class consisting of aluminum trihydrate and Wollastonite.

10. A method as claimed in claim 9, in which the mineral powder is present in the mixture in an amount from 10 to 20% by weight.

11. A method as claimed in claim 9, in which the inert mineral filler is present in the mixture in the amount of from 20 to 40% by weight.

12. A method as claimed in claim 9 in which the inert mineral filler is perlite.

13. A method as claimed in claim 9 in which the alkali-metal silicate is sodium or potassium silicate.

14. A method as claimed in claim 9 in which the alkali-metal silicate is sodium silicate.

* * * * *